United States Patent [19]

Edmondson

[11] Patent Number: 5,410,897
[45] Date of Patent: May 2, 1995

[54] VEHICLE WHEEL LOCKING AND ANTI-THEFT DEVICE

[76] Inventor: Jack M. Edmondson, 2001 Cedar Chase La., Atlanta, Ga. 30324

[21] Appl. No.: 91,248

[22] Filed: Jul. 13, 1993

[51] Int. Cl.⁶ .............................................. B60R 25/00
[52] U.S. Cl. .................................... 70/226; 70/237; 188/32
[58] Field of Search ............ 70/225, 226, 18, 19, 70/237; 188/32

[56] References Cited

U.S. PATENT DOCUMENTS

| | | |
|---|---|---|
| 1,347,262 | 7/1920 | Eichorn . |
| 1,386,414 | 8/1921 | Lawrence . |
| 1,396,067 | 11/1921 | Setkowski ........................... 70/225 |
| 2,960,857 | 11/1960 | Winter . |
| 3,695,071 | 10/1972 | West .................................... 70/18 X |
| 3,828,590 | 8/1974 | Thiebault ............................ 70/19 |
| 4,649,724 | 3/1987 | Raine .................................. 70/225 X |
| 4,688,408 | 8/1987 | Shroyer ............................... 70/226 |
| 4,723,426 | 2/1988 | Beaudoin ............................ 70/14 |
| 4,738,127 | 4/1988 | Johnson .............................. 70/209 |
| 4,819,462 | 4/1989 | Apsell .................................. 70/14 |
| 4,854,144 | 8/1989 | Davis ................................... 70/226 |
| 4,856,308 | 8/1989 | Johnson .............................. 70/209 |
| 4,878,366 | 11/1989 | Cox ..................................... 70/14 |
| 4,888,969 | 12/1989 | Suroff .................................. 70/226 |
| 5,137,121 | 8/1992 | Leonard .............................. 188/32 |
| 5,301,527 | 4/1994 | Pollard ................................ 70/226 |

FOREIGN PATENT DOCUMENTS

| | | | |
|---|---|---|---|
| 0189366 | 7/1986 | European Pat. Off. ............. 70/237 |
| 2091182 | 7/1982 | United Kingdom ................. 70/226 |

Primary Examiner—Lloyd A. Gall
Attorney, Agent, or Firm—James A. Hinkle

[57] ABSTRACT

A wheel-block lock has a chock on a chock end of a lock rod that is lockable in a lock sleeve. The lock sleeve is attached to a lug-cover shaft with a lug cover that is lockable onto a locking foot that is attached to a wheel with a lug nut. A single lock is employed to lock all parts of each lock unit together centrally. The wheel chock in select forms is positioned to be supported against a tire on the wheel to prevent rotation of the wheel. Two lock sleeves can be used on the same lock rod for attachment to two lug bolts. Either a padlock or a tumbler lock can be used for locking one or two wheel-block locks onto a wheel.

31 Claims, 4 Drawing Sheets

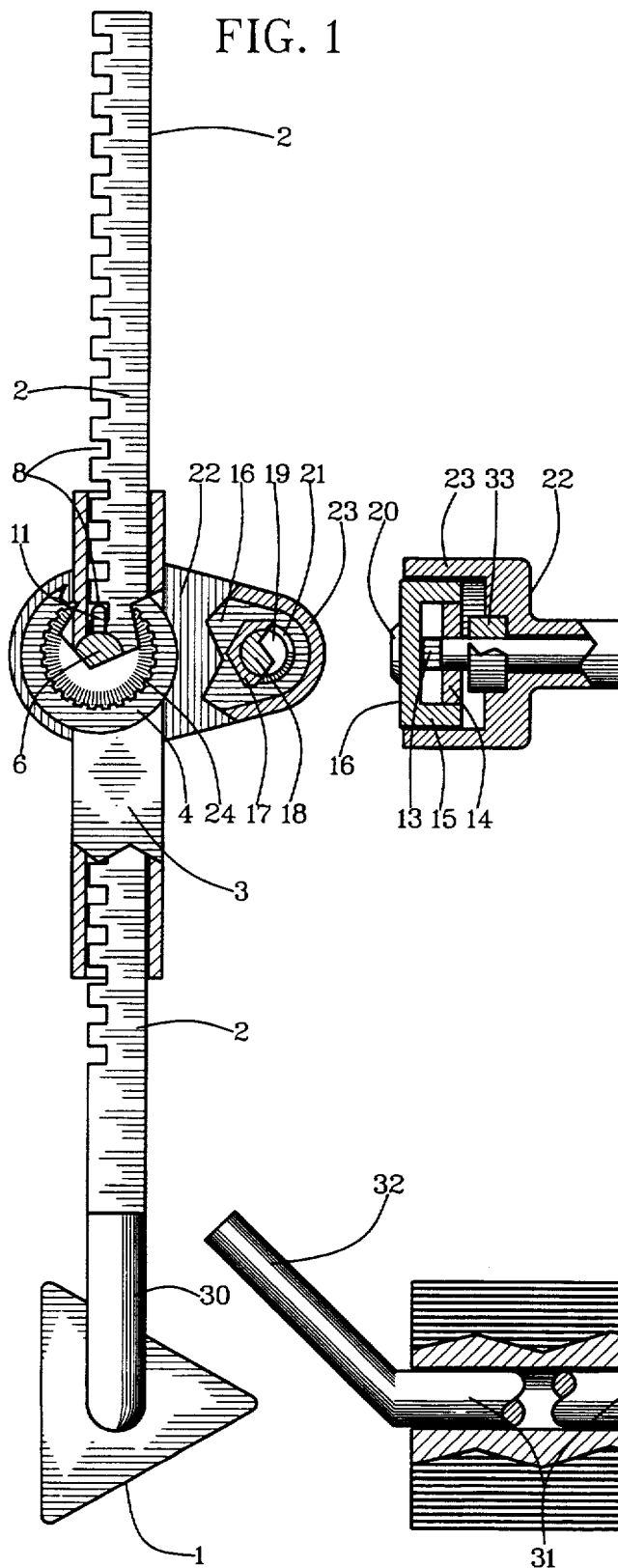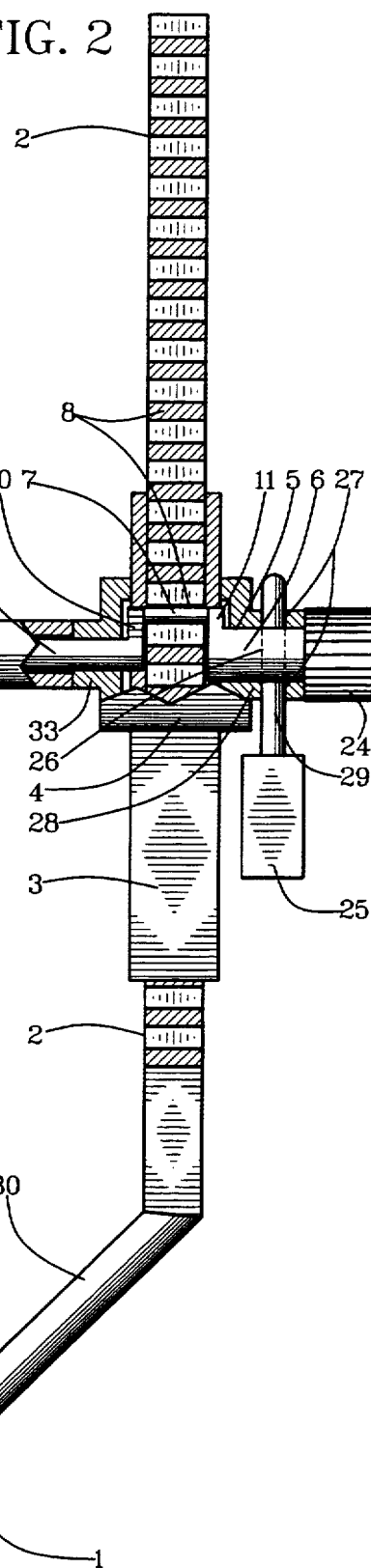

VEHICLE WHEEL LOCKING AND ANTI-THEFT DEVICE

BACKGROUND OF THE INVENTION

I. Field of the Invention.

The present invention relates generally to the field of wheel locks that are attachable to vehicle wheels to prevent them from being moved without authorization. In particular, it is a wheel chock that can be locked onto a trailer wheel as an anti-theft device.

II. Description of the Prior Art.

Locking trailers to prevent them from being stolen requires locking their wheels because there is no door to lock as for cars and trucks. There have been a variety of mechanisms for locking trailer wheels but none that attach to a lug nut on a wheel and provide a chock to prevent wheel rotation as taught by this invention. U.S. Pat. No. 5,137,121 taught a chock that clamped onto a wheel rim. U.S. Pat. No. 4,878,366 taught a blocking bar that was attachable with bolts inserted through openings in wheels. U.S. Pat. No. 4,819,462 describes a chock on a bar that is attachable to lug bolts directly instead of being attachable to an attachment foot that is held with a lug nut as taught by this invention. U.S. Pat. Nos. 4,856,308 and 4,738,127, granted to the same inventor, taught a steering-wheel lock with a telescopic bar different from a telescopic bar and lock employed in this invention with lug-bolt attachment and wheel-chock features not employed in the steering-wheel lock. U.S. Pat. No. 4,723,426 taught a wheel clamp with a disk that covered the hub section of a wheel on one jaw of the clamp and a hook that grasped the opposite side of a wheel. Although these and other known devices have features that are advantageous for particular applications, they are different and do not provide the convenience, ease of attachment and economy of protection against theft that is provided by this invention.

SUMMARY OF THE INVENTION

In accordance with the present invention, it is contemplated that in light of problems that have existed and that continue to exist in this field, a primary objective of this invention is to provide a wheel-chock lock which can be attached conveniently and easily.

Another objective is to provide a wheel-chock lock which is inexpensive to produce.

Another objective is to prevent removal of the wheel itself.

Another objective is to provide a wheel-chock lock which folds up for making it easy to carry and to store.

Yet another objective is to provide a wheel-chock lock that is adaptable to a wide variety of wheel sizes, locking preferences and wheel-blocking preferences.

This invention accomplishes the above and other objectives with a wheel-block lock having a chock on a chock end of a lock rod that is lockable in a lock sleeve. The lock sleeve is attached to a lug-cover shaft with a lug cover that is lockable onto a locking foot that is attached to a wheel with a lug nut. A single lock is employed to lock all parts together centrally. The wheel chock in select forms is positioned to be supported by a tire on the wheel in preventing rotation of the wheel.

BRIEF DESCRIPTION OF THE DRAWINGS

FIG. 1 is a cutaway side elevation view;

FIG. 2 is a cutaway top plan view;

DESCRIPTION OF THE PREFERRED EMBODIMENTS

Figure 12:
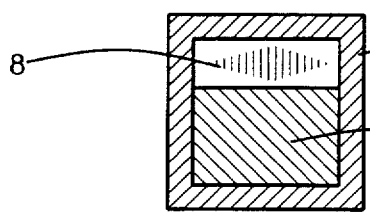
FIG. 12 is an end view of a rectangular lock rod slidable telescopically in a rectangular lock sleeve.
Figure 13:
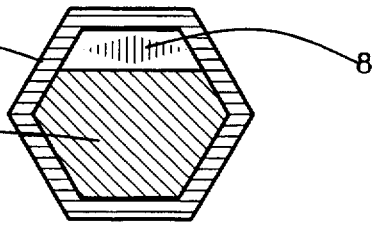
FIG. 13 is an end view of an optional hexagonal lock rod slidable telescopically in a hexagonal lock sleeve.

Referring to the drawings wherein like reference numerals designate corresponding parts throughout the several figures, reference is made first to FIGS. 1 and 2. A wheel chock 1 is attachable to a chock end of a lock rod 2 that is slidable telescopically in an internal periphery of a lock sleeve 3. An external periphery of the lock rod 2 and the internal periphery of the lock sleeve 3 have an equal number of sides between dihedral angles as illustrated in FIGS. 12 and 13 to prevent rotation while allowing linear sliding of the lock rod 2 in the lock sleeve 3. Attached to the lock sleeve 3 is lock housing 4 having a lock-shaft -bearing orifice 5 in which a lock shaft 6 is rotatable. The lock rod 2 is locked linearly to the lock sleeve 3 with an offset latch shaft 7 that fits in a select one of a plurality of lock grooves 8 in the lock rod 2. The offset latch shaft 7 is offset-attached to a latch shaft 9 with an internal offset appendage 10 and offset-attached to the lock shaft 6 with an external offset appendage 11. The latch shaft 9 is positioned pivotally inside of a lug-cover sleeve 12. Attached perpendicularly to an opposite end of the latch shaft 9 from the lock housing 4 is a cover latch 13. Only a rear surface of the cover latch 13 is shown in this illustration. Locking relationship of the offset latch shaft 7 and the cover latch 113 is shown in greater detail in FIGS. 3–8 and in a locking-plan view in FIG. 9.

Although illustrated in trihedral form, the wheel chock 1 can be any of a variety of shapes. It can be polygonal with straight or arcuate sides or with a combination of straight and arcuate sides. A cylindrical shape is preferable for some applications. A hexagonal shape is preferable for other use conditions.

The lock shaft 6 and the latch shaft 9 are concentric and function as a single shaft with the offset latch shaft 7 at a lock end and the cover latch 13 at a lug end. Rotation of the lock shaft 6 to position the offset latch shaft 7 in a lock groove 8 also positions the cover latch 13 under a latch plate 14. The latch plate 14 is extended frown a lock-attachment wall 15 of a lug-bolt plate 16 that is attachable to a vehicle wheel with a lug nut 17 on a lug bolt 18. The lock-attachment wall 15 is circular and extended perpendicularly from the lug-bolt plate 16 through which a lug-bolt orifice 19 is extended. Similar to lug nut 17, the lug-bolt plate 16 has a centering boss 20 on a bottom surface and a centering countersink 21 on a top surface surrounding the lug-bolt orifice 19. The cover latch 13 is in a locking relationship when rotated to a position between latch plate 14 and the lug-bolt plate 16. A lug cover 22 on a lug-cover end of the lug-cover sleeve 12 has lug-cover walls 23 that encompass the lock-attachment wall 15 and edges of the lug-bolt plate 16 snugly when the cover latch 13 is in a locking relationship.

The lock shaft 6 and the latch shaft 9 can be rotated by a lock knob 24 attached to the lock shaft 6. The lock knob 24 is optional and variable in size and form for various types of locks that can be used.

One form of lock that can be employed is a conventional padlock 25. For use of a conventional padlock 25, a shaft lock orifice 26 in the lock shaft 6 is aligned concentrically with housing lock orifices 27 in a housing sleeve 28. A shackle 29 of the padlock 25 is then positioned in the aligned orifices 26 and 27.

A conventional padlock 25 is a desirable locking means for several reasons. A large lock knob 24 can be used to position a tight-fitting cover latch 13 circumferentially under a cam-shaped bevelled latch plate for snug fitting of the lug cover 22 on the lug-bolt plate 16. Lock methods that rotate the lock shaft 6 and the latch shaft 9 with only a key in a tumbler lock do not provide as much rotational leverage for a tight fit. A combination lock is similar to a key lock in this regard. When a tumbler lock is used with either a key or a combination dial, it is preferable that a knob be employed also in much the same manner as a door knob is employed in addition to a key that fits into a keyhole centrally.

The objective of this dual-locking mechanism is to lock the lug cover 22 onto the lug-bolt plate 16 and then to lock the lock rod 2 in the lock sleeve 3 with a desired length of the lock rod 2 between the lock housing 4 and the wheel chock 1 for positioning the wheel chock 1 snugly against a wheel to which the lug-bolt plate 16 is attached. The lug-bolt plate 16 can be referred to also as a locking foot, although lug-bolt plate is more descriptive of the system.

The wheel chock 1 can be attached to the lock rod 2 with an angled attachment rod 30 that is extended rigidly at a desired angle from the rod end of the lock rod 2. The wheel chock 1 can be positioned on a perpendicular chock rod 31 that is extended from the angled attachment rod 30. An angled enclosure rod 32 can be extended frown the perpendicular chock rod 31 at a desired complementary angle to the angled attachment rod 30. The angled attachment rod 30 can be attached rigidly to the lock rod 2 and the wheel chock 1 can be rotatable and slidable on tile perpendicular chock rod 31. The angled enclosure rod 32 and the angled attachment rod 30 can have an angle between them that is designed to position the two rods 30 and 32 snugly against opposite sides of a tire on a wheel when tile wheel chock 1 is fit snugly under a circumferential portion of the tire.

Various other attachments for the wheel chock can be employed within the intent and foreseeability of this invention. Some are described in relation to FIG. 14.

Figure 3:
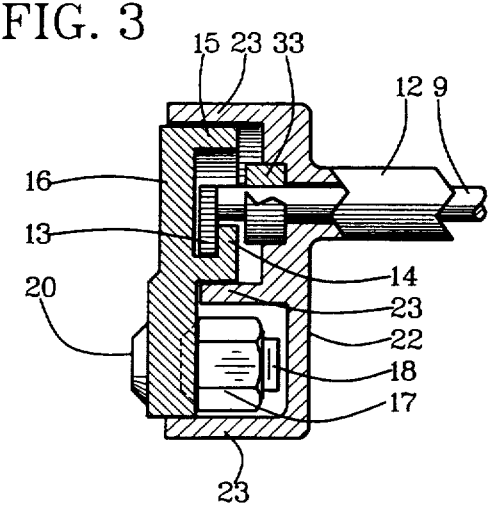
FIG. 3 is a sectional cutaway side elevation view of a lug cover attached to a lug-bolt plate held by a lug nut on a lug bolt of a vehicle wheel.
Figure 4:
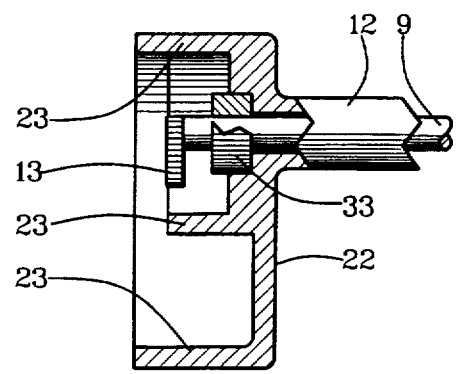
FIG. 4 is a sectional cutaway side elevation view of a lug cover separate from the lug-bolt plate.

Reference is made now to FIGS. 2–5. The latch shaft 9 can be rotatable in latch-shaft bearings 33 at the lug cover 22 and optionally at the lock housing 4. The lock-shaft-bearing orifice 5, however, is a bearing surface for the latch shaft 9 also, such that a latch-shaft bearing 33 at the lock housing is not necessary for some applications and structures. FIG. 3 illustrates attachment of the lug cover 22 to the lug-bolt plate 16 with the cover latch 13 positioned between tile latch plate 14 and the lug-bolt plate 16.

Figures 5, 6, 7, 8:
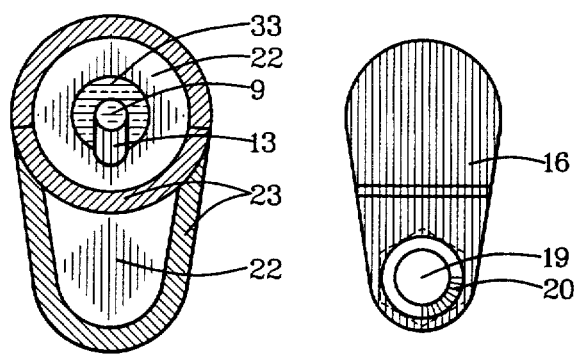
FIG. 5 is a bottom plan view of the lug cover.
FIG. 6 is a bottom plan view of the lug-bolt plate.
FIG. 7 is a top plan view of tile lug-bolt plate.
FIG. 8 is a cutaway side elevation view of tile lug-bolt plate on a lug bolt.

Referring to FIGS. 6–8, the lug-bolt plate 16 remains on a wheel to which it has been attached by removing a lug nut 17, positioning the lug bolt 18 in the lug-bolt orifice 19 and then repositioning the lug nut 17 over the lug-bolt plate 16. After that, the lug-bolt cover 22 can be attached with the cover latch 13 rotated to a locking position between the latch plate 14 and the lug-bolt plate 16.

Figure 9:
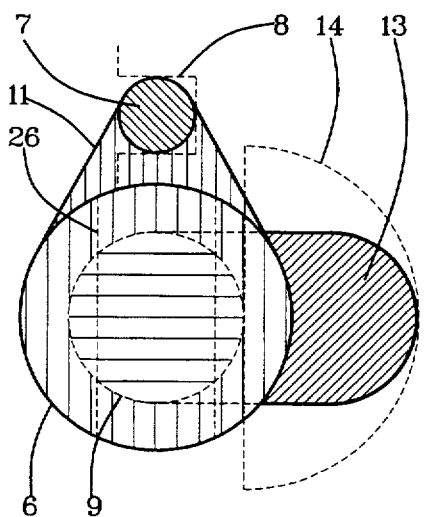
FIG. 9 is a plan view of a dual locking mechanism that locks the lug cover to the lug-bolt plate and locks the lock rod in the lock sleeve simultaneously.

Referring to FIG. 9, the offset latch shaft 7 and the cover latch 13 are extended from shafts with the same axis and are positioned at approximately right angles from each other. The shafts having the same axes are the lock shaft 6 and the latch shaft 9 which are in line concentrically. In the illustration of this plan view, the cover latch 13 is positioned under the latch plate 14 which is shown in dashed lines. At the same time but ninety degrees apart counterclockwise, the offset latch shaft 7 is positioned in a lock groove 8 which is represented by dashed lines. Rotation of the lock shaft 6 in a counterclockwise direction first removes the off set latch shaft out of the lock groove 8 to the left in the drawing. Further rotation counterclockwise removes the cover latch 13 out from under the latch plate 14. When the offset latch shaft 7 is in a plane horizontal to the lock shaft 6 on the drawing, the cover latch 13 is then vertical mathematically on the drawing and side walls of the cover latch 13 are then parallel to a straight side of the latch plate 14 in an unlocked position for both. Rotation of the lock shaft 6 clockwise in a direction for again locking both the offset latch shaft 7 and the cover latch 13 first positions the cover latch 13 increasingly under the latch plate 14 before the offset latch shaft 7 enters the lock groove 8. This locks the lug cover 22, together with the lug-cover sleeve 12 and the lock housing 4 with its locking components, onto lug bolt 18 before the lock rod 2 is locked in a position in the lock sleeve 3. This pre-locking of the locking mechanism to a wheel allows adjustment of telescopic length of the lock rod 2 for positioning the wheel chock 1 a desired distance from a wheel axle at a position snugly against an outside periphery of a tire of the wheel. After the wheel chock 1 has been positioned effectively, then final rotation of the lock shaft 6 is continued clockwise to where the offset latch shaft 7 enters the lock groove 8 for locking both lock members. Finally, a padlock shackle 29, shown in FIGS. 2 and 10, can be inserted into shaft lock orifice 26 to prevent unlocking counterclockwise rotation of the lock shaft 6.

Figure 10:
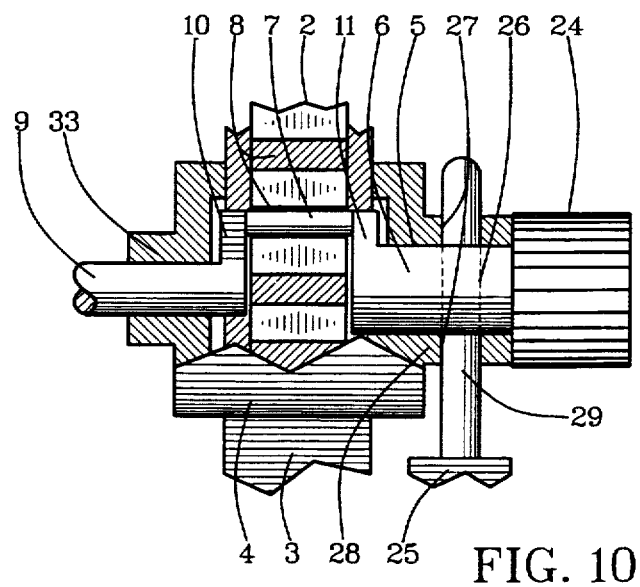
FIG. 10 is a sectional cutaway elevation view of the locking mechanism for locking the lock rod in the lock sleeve and employing a padlock for locking a latch shaft for the dual locking mechanism.

Referring to FIGS. 1, 2 and 10, the offset latch shaft 7 is positioned in a lock groove 8 represented in FIGS. 2 and 10 by slanted hatch lines and in FIG. 1 by a right-angular groove. This is a magnification of the locking section shown in FIG. 2. Illustrated in FIG. 10 is different sizing of diameters of the lock shaft 6 and the latch shaft 9 which are concentric and mathematically the same shaft with the same axis. The lock shaft 6 can be larger in diameter for providing sufficient cross-sectional area for a shaft lock orifice 26 and still provide sufficient material strength of the lock shaft 6 at sides of the lock shaft orifice 26. The latch shaft 9 and tile lug-cover sleeve 12 can be larger also if desired for greater material strength for attachment to the lug-bolt plate 16. One preferred design would have the latch shaft 9 larger in diameter than the proportions illustrated but hollow like tubing. Then the lock shaft 6 could be the same or a different diameter but solid to provide support for a lock shackle 29 in the shaft lock orifice 26. The offset latch shaft 7 can be polygonal or cylindrical as shown.

Figure 11:
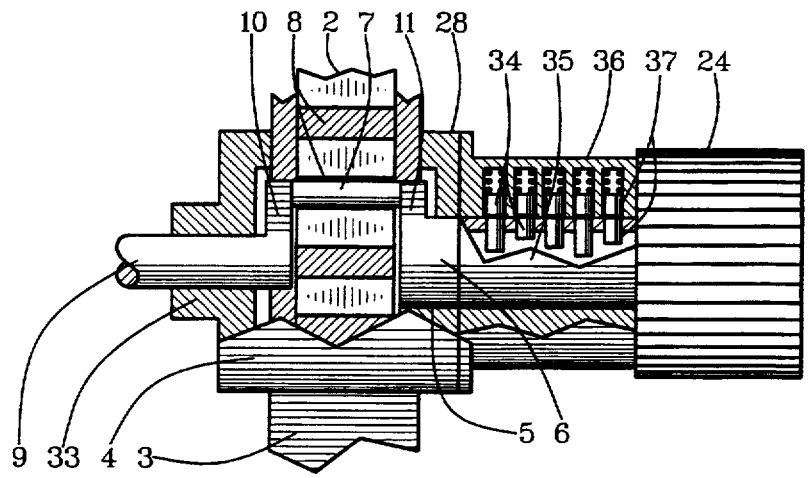
FIG. 11 is a sectional cutaway side elevation view of a standard tumbler lock extended from the latch shaft for the dual locking mechanism.

Referring to FIG. 11, a standard lock can be employed with lock tumblers 34 communicative between a lock cylinder 35 and a lock sleeve 36 in lock slots 37. The lock cylinder 35 can be attachable rigidly and concentrically to the lock shaft 6 and the lock sleeve 36 can be attachable rigidly and concentrically to the housing sleeve 28 proximate the lock-shaft bearing orifice 5. Standard key or combination lock technology can be employed for installing and operating the tumbler lock. Concentricity of the lock shaft 6 and a housing sleeve 28 with either the padlock or tumbler lock is provided for installing and operating this dual locking mechanism for either type of known lock.

Referring to FIGS. 12 and 13, the lock rod 2 can be rectangular as shown in FIG. 12 or polygonal with more than four sides as shown in FIG. 13. The lock sleeve 3 is sized and shaped correspondingly for telescopic sliding of the lock rod 2 in the lock sleeve 3. The rectangular lock rod 2 and lock sleeve 3 need not be square, but may be of any feasible geometric shape.

Figure 14:
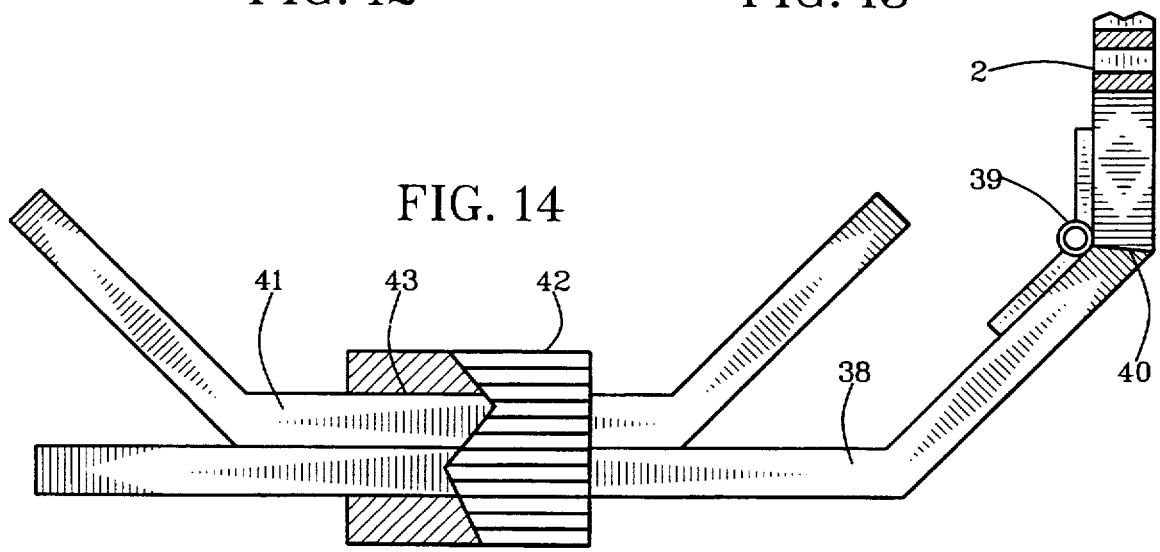
FIG. 14 is a sectional plan view of a pivotal wheel chock having selective and adjustable settings.

Referring to FIG. 14, a polygonal chock rod 38 can be attached pivotally to a chock end of the lock rod 2 in a manner that allows inward pivoting but not outward pivoting from perpendicularity of the polygonal chock rod 38 with the lock rod 2. A rod hinge 30 sized appropriately and positioned on a wheel side of the lock rod 2 and polygonal chock rod 38 can be employed in conjunction with a hinge buttress 40 on contact ends of the polygonal chock rod 38 and the lock rod 2 as shown. This is a chock attachment that can be constructed with a variety of design preferences. One design preference is for the polygonal chock rod 38 to be extended straight perpendicularly to the lock rod 2 or angled and then straightened to perpendicularity with the lock rod 2 as shown. An enclosure rod 41 is attached slidably or rigidly to the polygonal chock rod 38 with a sleeve chock 42. The sleeve chock 42 can be large enough to function as a wheel chock or small enough to provide only an attachment function as desired. The sleeve chock 42 can be attached rigidly or slidably to either or both the polygonal chock rod 38 and the enclosure rod 41. Other variations are foreseeable.

The purpose of the enclosure rod 41 is to position a wheel between angled ends of the enclosure rod 41. The purpose of the rod hinge 39 is to enhance portability and storage convenience of the locking system. A polygonal form of the polygonal chock rod 38, tile enclosure rod 41 and a sleeve-chock orifice 43 is to arrest rotation of tile enclosure rod 41 on the polygonal chock rod 38.

Figure 15:
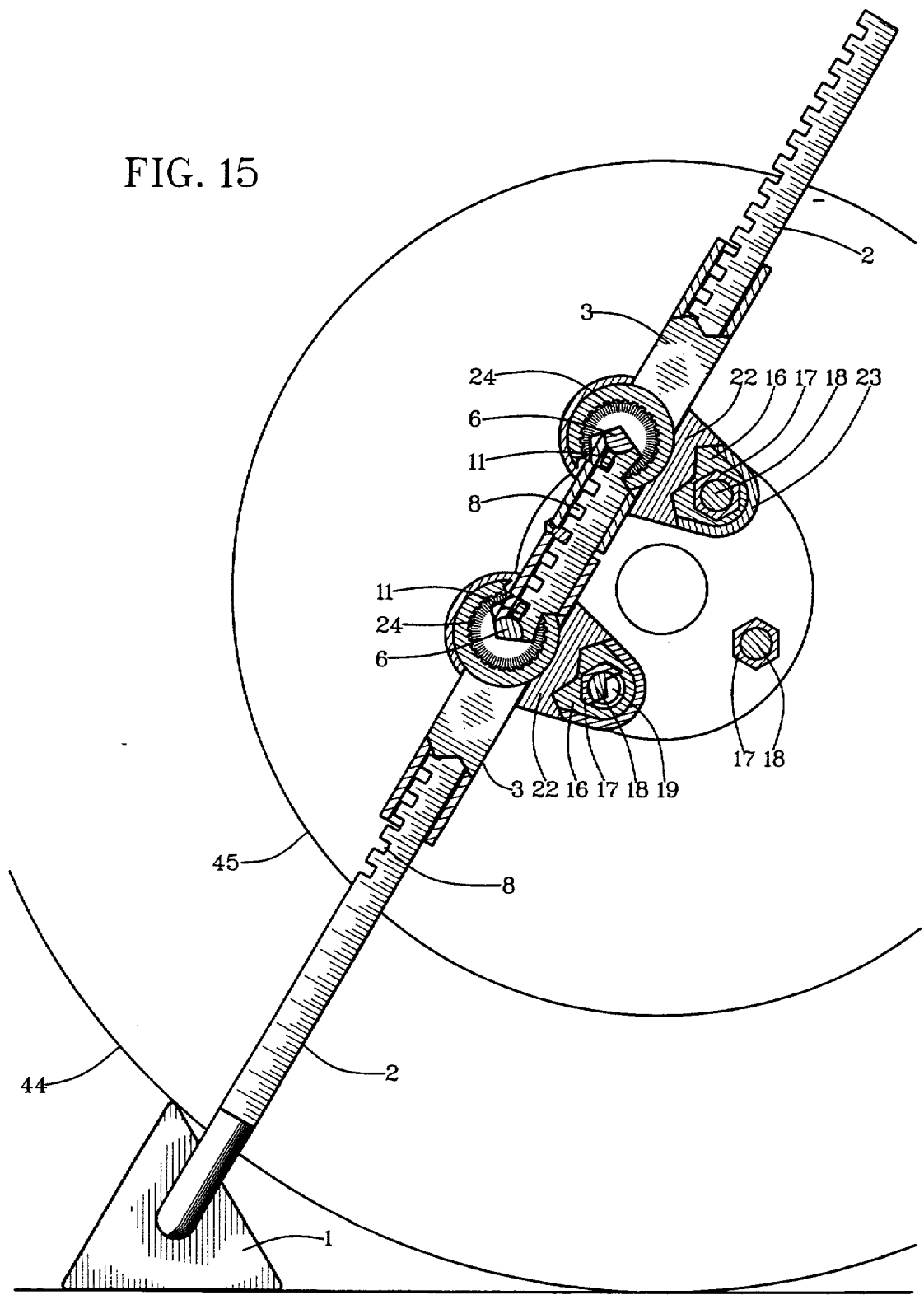
FIG. 15 is a partial cutaway side elevation view of an embodiment having a single lock rod attached to two lug bolts with separate lock sleeves and related locking mechanisms.

Referring lastly to FIG. 15, the wheel chock 1 can be positioned under a tire 44 that is on a wheel 45 to which the lock rod 2 is attached with either one or two lock sleeves 3 and related locking components. When two lock sleeves 3 are employed, they can be positioned with short ends head-to-head in order to bring them close together as shown. Opposite or adjacent lug bolts 18 can be used for attachment of the lug-bolt plates 16. Seconds of all components are the same as described for a first of all components for the two lock sleeves.

Various modifications may be made of the invention without departing from the scope thereof and it is desired, therefore, that only such limitations shall be placed thereon as are imposed by the prior art and which are set forth in the appended claims.

What is claimed is:

1. A wheel-chock lock comprising:
 a wheel chock assembly attachable to a lock rod having a plurality of sides between dihedral angles,
 a lock sleeve having an internal periphery with a plurality of sides between dihedral angles matching the plurality of sides between dihedral angles of the lock rod,
 the lock rod being slidable telescopically in the lock sleeve,
 a lug-cover sleeve attached perpendicularly to the lock sleeve,
 a lug-bolt plate having a lug-bolt orifice through which a lug bolt of a vehicle wheel is inserted through a bolt end of the lug-bolt plate,
 lock-attachment walls juxtaposed to the lug-bolt orifice and extended perpendicularly from an attachment end of the lug-bolt plate,
 a latch plate extended from a lock-attachment wall parallel to the lug-bolt plate,
 a lug cover on a lug-cover end of the lug-cover sleeve,
 the lug cover being sized and shaped to encompass and to fit over a lug nut on the lug bolt, the lug-bolt plate, the lock-attachment walls and the latch plate,
 a latch shaft positioned pivotally inside of the lug-cover sleeve and extended from proximate the lock sleeve to proximate the latch plate,
 a cover latch extended perpendicularly from a lug end of the latch shaft at a position proximate an inside surface of the latch plate,
 the latch shaft being rotatable to a latched position with the cover latch intermediate the lug-bolt plate and the latch plate for attaching the lug-cover sleeve and the lug cover to the lug-bolt plate,
 the latch shaft being rotatable to an unlatched position with the cover latch external to a position intermediate the lug-bolt plate and the latch plate,
 a plurality of lock grooves in a common side of the lock rod,
 an offset latch shaft parallel to the latch shaft,
 an internal offset appendage attached perpendicularly to a lock end of the latch shaft and attached perpendicularly to an internal end of the offset latch shaft,
 an external offset appendage parallel to the internal offset appendage and attached perpendicularly to an external end of the offset latch shaft,
 a lock shaft attached perpendicularly to the external offset appendage and extended concentrically to the latch shaft through a lock-shaft-bearing orifice in a lock housing that is attached to the lock sleeve,
 the cover latch and the offset latch shaft being positioned radially in relation to the latch shaft at circumferential positions in which the cover latch is in a locking relationship intermediate the lug-bolt plate and the latch plate and the offset latch shaft is in locking relationship within a select one of the plurality of lock grooves in the lock rod simultaneously at a select locking rotational positioning of the lock shaft, and the cover latch and the offset latch shaft being positioned radially in relation to the latch shaft at circumferential positions in which the cover latch is in an unlocked relationship at a position external to a position intermediate the lug-bolt plate and the latch plate and the offset latch shaft is in an unlocked relationship at a position external to the plurality of lock grooves in the lock rod simultaneously at a select unlocking rotational positioning of the lock shaft.

2. A wheel-chock lock as claimed in claim 1 and further comprising a lock knob attached to the lock shaft.

3. A wheel-chock lock as claimed in claim 1 and further comprising a locking means in locking relationship between the lock housing and the lock shaft.

4. A wheel-chock lock as claimed in claim 3, wherein the locking means is a padlock having a shackle positioned removably in lock orifices in the lock housing and in the lock shaft when positioned in concentric relationship with select rotation of the lock shaft.

5. A wheel-chock lock as claimed in claim 3 wherein:
the locking means is a tumbler lock having lock tumblers in lock slots in communication between a lock cylinder and a lock sleeve,
the lock cylinder being attachable rigidly and concentrically to the lock shaft,
the lock sleeve being attachable rigidly to the lock housing proximate the lock-shaft bearing orifice, and
the lock tumblers being operable by standard locking means.

6. A wheel-chock lock as claimed in claim 1 and further comprising:
a second lock sleeve having an internal periphery with a plurality of sides between dihedral angles matching the plurality of sides between dihedral angles of the lock rod,
the lock rod being slidable telescopically in the second lock sleeve,
a second lug-cover sleeve attached perpendicularly to the second lock sleeve,
a second lug-bolt plate having a lug-bolt orifice through which a second lug bolt of the vehicle wheel is inserted through a bolt end of the second lug-bolt plate,
lock-attachment walls juxtaposed to the lug-bolt orifice of the second lug-bolt plate and extended perpendicularly from an attachment end of the second lug-bolt plate,
a second latch plate extended from a lock-attachment wall parallel to the second lug-bolt plate,
a second lug cover on a lug-cover end of the second lug-cover sleeve,
the second lug cover being sized and shaped to encompass and to fit over a lug nut on the second lug bolt, the second lug-bolt plate, the lock-attachment walls and the latch plate of the second lug-bolt plate,
a second latch shaft positioned pivotally inside of the second lug-cover sleeve and extended from proximate the second lock sleeve to proximate the second latch plate,
a second cover latch extended perpendicularly from a lug end of the latch shaft positioned pivotally inside of the second lug-cover sleeve at a position proximate an inside surface of the second latch plate,
the second latch shaft being rotatable to a latched position with the second cover latch intermediate the lug-bolt plate and the latch plate of the second lug-bolt plate for attaching the second lug-cover sleeve and the second lug cover to the second lug-bolt plate,
the second latch shaft being rotatable to an unlatched position with the second cover latch external to a position intermediate the second lug-bolt plate and the second latch plate,
a second offset latch shaft parallel to the second latch shaft,
a second internal offset appendage attached perpendicularly to a lock end of the second latch shaft and attached perpendicularly to an internal end of the second offset latch shaft,
a second external offset appendage parallel to the second internal offset appendage and attached perpendicularly to an external end of the second offset latch shaft,
a second lock shaft attached perpendicularly to the second external offset appendage and extended concentrically to the second latch shaft through a second lock-shaft-bearing orifice in a second lock housing that is attached to the second lock sleeve,
the second cover latch and the second offset latch shaft being positioned radially in relation to the second latch shaft at circumferential positions in which the second cover latch is in a locking relationship intermediate tile second lug-bolt plate and the second latch plate and the second offset latch shaft is in locking relationship within a select one of the plurality of lock groove in the lock rod simultaneously at a select locking rotational positioning of the second lock shaft, and
the second cover latch and the second offset latch shaft being positioned radially in relation to the second latch shaft at circumferential positions in which the second cover latch is in an unlocked relationship at a position external to a position intermediate the second lug-bolt plate and the second latch plate and the second offset latch shaft is in an unlocked relationship at a position external to the plurality of lock grooves in the lock rod simultaneously at a select unlocking rotational position of the second lock shaft.

7. A wheel-chock lock comprising:
a wheel chock assembly attachable to a lock rod having a rectangular cross section,
a lock sleeve having a rectangular internal periphery in which the lock rod is slidable telescopically,
a lug-cover sleeve attached perpendicularly to the lock sleeve,
a lug-bolt plate having a lug-bolt orifice through which a lug bolt of a vehicle wheel is inserted through a bolt end of the lug-bolt plate,
lock-attachment walls juxtaposed to tile lug-bolt orifice and extended perpendicularly from an attachment end of the lug-bolt plate,
a latch plate extended from a lock-attachment wall parallel to the lug-bolt plate,
a lug cover on a lug-cover end of the lug-cover sleeve, the lug cover being sized and shaped to encompass and to fit over a lug nut on the lug bolt, the lug-bolt plate, the lock-attachment walls and the latch plate, a latch shaft positioned pivotally inside of the lug-cover sleeve and extended from proximate tile lock sleeve to proximate the latch plate, a cover latch extended perpendicularly from a lug end of the latch shaft at a position proximate an inside surface of the latch plate, the latch shaft being rotatable to a latched position with the cover latch intermediate the lug-bolt plate and the latch plate for attaching the lug-cover sleeve and the hag cover to the lug-bolt plate, the latch shaft being rotatable to an unlatched position with the cover latch external to a position intermediate the lug-bolt plate and the latch plate, a plurality of lock grooves in a common side of the lock rod, an offset latch shaft parallel to the latch shaft, an internal offset appendage attached perpendicularly to a lock end of the latch shaft and attached perpendicularly to an internal end of the offset latch shaft, an external offset appendage parallel to the internal offset appendage and attached perpendicularly to an external end of the offset latch shaft, a lock shaft attached perpendicularly to the external offset appendage and extended concentrically to the latch shaft through a lock-shaft-bearing orifice in a lock housing that is attached to the lock sleeve, the cover latch and the offset latch shaft being positioned radially in relation to the latch shaft at circumferential positions in which the cover latch is in a locking relationship intermediate the lug-bolt plate and the latch plate and the offset latch shaft is in locking relationship within a select one of the plurality of lock grooves in the lock rod simultaneously at a select locking rotational positioning of the lock shaft, and the cover latch and the offset latch shaft being positioned radially in relation to the latch shaft at circumferential positions in which the cover latch is in an unlocked relationship at a position external to a position intermediate the lug-bolt plate and the latch plate and the offset latch shaft is in an unlocked relationship at a position external to the plurality of lock grooves in the lock rod simultaneously at a select unlocking rotational positioning of the lock shaft.

8. A wheel-chock lock as claimed in claim 7 and further comprising a lock knob attached to the lock shaft.

9. A wheel-chock lock as claimed in claim 7 and further comprising a locking means in locking relationship between the lock housing and the lock shaft.

10. A wheel-chock lock as claimed in claim 9, wherein the locking means is a padlock having a shackle positioned removably in lock orifices in the lock housing and in the lock shaft when positioned in concentric relationship with select rotation of the lock shaft.

11. A wheel-chock lock as claimed in claim 10 and further comprising a lock knob attached to the lock shaft.

12. A wheel-chock lock as claimed in claim 11 wherein:

the wheel chock assembly is attached to the lock rod by means of a rigid chock rod extended rigidly from a chock end of the lock rod, the rigid chock rod being perpendicular to the lock rod.

13. A wheel-chock lock as claimed in claim 12 and further comprising a chock sleeve that is slidable on the rigid chock rod.

14. A wheel-chock lock as claimed in claim 11 wherein:

the wheel chock assembly is attached to the lock rod by means of an angled rigid chock rod extended rigidly from a chock end of the lock rod, the angled rigid chock rod being extended first at a select angle from the lock rod, then perpendicular to the lock rod and finally at a complementary angle such that a wheel of a vehicle to which the wheel-chock lock is attached is positioned between the select angle and the complementary angle, and the wheel chock assembly having in juxtaposed relationship the rigid chock rod and a chock-centering appendage which is attached slidably to the angled rigid chock rod at a position in which the angled rigid chock rod is perpendicular to the lock rod.

15. A wheel-chock lock as claimed in claim 7, wherein the wheel chock assembly is pivotally attached to the lock rod.

16. A wheel-chock lock as claimed in claim 15, wherein the wheel-chock assembly comprises a chock rod and a chock-centering appendage in juxtaposed relation, the chock-centering appendage being slidable with respect to the chock rod so that the chock-centering appendage is centered on a tire on a wheel of a vehicle to which the wheel-chock lock is attached.

17. A wheel-chock lock as claimed in claim 7, wherein the wheel chock assembly comprises a trihedral block attached to a chock rod that is attachable to the lock rod.

18. A wheel-chock lock as claimed in claim 17, wherein the tihedral block is slidable on the chock rod to a select position in relation to positioning of a tire on the wheel to which the wheel-chock lock is attachable.

19. A wheel-chock lock as claimed in claim 17, wherein the chock rod is rectangular.

20. A wheel-chock lock as claimed in claim 7 and further comprising:

a second lock sleeve having a rectangular internal periphery in which the lock rod is slidable telescopically, a second lug-cover sleeve attached perpendicularly to the second lock sleeve, a second lug-bolt plate having a lug-bolt orifice through which a second lug bolt of the vehicle wheel is inserted through a bolt end of the second lug-bolt plate, lock-attachment walls juxtaposed to the lug-bolt orifice of the second lug-bolt plate and extended perpendicularly from an attachment end of the second lug-bolt plate, a second latch plate extended from a lock-attachment wall parallel to the second lug-bolt plate, a second lug cover on a lug-cover end of the second lug-cover sleeve, the second lug cover being sized and shaped to encompass and to fit over a lug nut on the second lug bolt, the second lug-bolt plate, the lock-attachment walls and the latch plate of the second lug-bolt plate, a second latch shaft positioned pivotally inside of the second lug-cover sleeve and extended from proximate the second lock sleeve to proximate the second latch plate, a second cover latch extended perpendicularly from a lug end of the second latch shaft positioned pivotally inside of the second lug-cover sleeve at a position proximate an inside surface of the second latch plate, the second latch shaft being rotatable to a latched position with the second cover latch intermediate the second lug-bolt plate and the second latch plate for attaching the second lug-cover sleeve and the second lug cover to the second lug-bolt plate, the second latch shaft being rotatable to an unlatched position with the second cover latch external to a position intermediate the second lug-bolt plate and the second latch plate, a second offset latch shaft parallel to the second latch shaft, a second internal offset appendage attached perpendicularly to a lock end of the second latch shaft and attached perpendicularly to an internal end of the second offset latch shaft, a second external offset appendage parallel to the second internal offset appendage and attached perpendicularly to an external end of the second offset latch shaft, a second lock shaft attached perpendicularly to the second external offset appendage and extended concentrically to the second latch shaft through a second lock-shaft-bearing orifice in a second lock housing that is attached to the second lock sleeve, the second cover latch and the second offset latch shaft being positioned radially in relation to the second latch shaft at circumferential positions in which the second cover latch is in a locking relationship intermediate the second lug-bolt plate and the second latch plate and the second offset latch shaft is in locking relationship within a select one of the plurality of lock grooves in the lock rod simultaneously at a select locking rotational positioning of the second lock shaft, and the second cover latch and the second offset latch shaft being positioned radially in relation to the second latch shaft at circumferential positions in which the second cover latch is in an unlocked relationship at a position external to a position intermediate second the lug-bolt plate and the second latch plate and the second offset latch shaft is in an unlocked relationship at a position external to the plurality of lock grooves in the lock rod simultaneously at a select unlocking rotational positioning of the second lock shaft.

21. A wheel-chock lock comprising:

a wheel chock assembly attachable to a lock rod having a rectangular cross section, a lock sleeve having a rectangular internal periphery in which the lock rod is slidable telescopically, a lug-cover sleeve attached perpendicularly to the lock sleeve, a lug-bolt plate having a lug-bolt orifice through which a lug bolt of a vehicle wheel is inserted through a bolt end of the lug-bolt plate, lock-attachment walls juxtaposed to the lug-bolt orifice and extended perpendicularly from an attachment end of the lug-bolt plate, a latch plate extended from a lock-attachment wall parallel to the lug-bolt plate, a lug cover on a lug-cover end of the lug-cover sleeve, the lug cover being sized and shaped to encompass and to fit over a lug nut on the lug bolt, the lug-bolt plate, the lock-attachment walls and the latch plate, a latch shaft positioned pivotally inside of the lug-cover sleeve and extended from proximate the lock sleeve to proximate the latch plate, a cover latch extended perpendicularly from a lug end of the latch shaft at a position proximate an inside surface of the latch plate, the latch shaft being rotatable to a latched position with the cover latch intermediate the lug-bolt plate and the latch plate for attaching the lug-cover sleeve and the lug cover to the lug-bolt plate, the latch shaft being rotatable to an unlatched position with the cover latch external to a position intermediate the lug-bolt plate and the latch plate, a plurality of lock grooves in a common side of the lock rod, an offset latch shaft parallel to tile latch shaft, an internal offset appendage attached perpendicularly to a lock end of the latch shaft and attached perpendicularly to an internal end of the offset latch shaft, an external offset appendage parallel to the internal offset appendage and attached perpendicularly to an external end of the offset latch shaft, a lock shaft attached perpendicularly to the external offset appendage and extended concentrically to the latch shaft through a lock-shaft-bearing orifice in a lock housing that is attached to the lock sleeve, the cover latch and the offset latch shaft being positioned radially in relation to the latch shaft at circumferential positions in which the cover latch is in a locking relationship intermediate the lug-bolt plate and the latch plate and the offset latch shaft is in locking relationship within a select one of the plurality of lock grooves in the lock rod simultaneously at a select locking rotational positioning of the lock shaft, the cover latch and the offset latch shaft being positioned radially in relation to the latch shaft at circumferential positions in which the cover latch is in an unlocked relationship at a position external to a position intermediate the lug-bolt plate and the latch plate and the offset latch shaft is in an unlocked relationship at a position external to the plurality of lock grooves in the lock rod simultaneously at a select unlocking rotational positioning of the lock shaft, a tumbler lock having lock tumblers communicative between a lock cylinder and a lock sleeve in lock slots, the lock cylinder being attachable rigidly and concentrically to the lock shaft, the lock sleeve being attachable rigidly and concentrically to the lock housing proximate the lock-shaft bearing orifice, and the lock tumblers being operable by standard locking means.

22. A wheel-chock lock as claimed in claim 21, wherein the wheel chock assembly is pivotally attachable to the lock rod.

23. A wheel-chock lock as claimed in claim 22, wherein the wheel-chock assembly comprises a chock rod and a chock-centering appendage in juxtaposed relation, the chock-centering appendage being slidable with respect to the chock rod so that the chock-centering appendage is centered on a tire on a wheel of a vehicle to which the wheel-chock lock is attached.

24. A wheel-chock lock as claimed in claim 21, wherein the wheel chock assembly comprises a chock-centering appendage slidable on a chock rod to a select position in relation to positioning of a tire on the wheel to which the wheel-chock lock is attachable.

25. A wheel-chock lock as claimed in claim 24, wherein the chock-centering appendage comprises means extended at a select angle from each side of the chock-centering appendage for positioning the chock-centering appendage with respect to the tire and wheel to which the wheel chock lock is attachable.

26. A wheel-chock lock as claimed in claim 25, wherein the chock rod is rectangular.

27. A wheel-chock lock as claimed in claim 21 wherein:
   the wheel chock assembly is attached to the lock rod by means of a rigid chock rod extended rigidly from a chock end of the lock rod,
   the rigid chock rod being perpendicular to the lock rod.

28. A wheel-chock lock as claimed in claim 27 and further comprising a chock sleeve that is slidable on the rigid chock rod.

29. A wheel-chock lock as claimed in claim 28 and further comprising at least one chock-centering appendage extended at a select angle with respect to the rigid chock rod such that the chock-centering appendage is centered on a tire on a wheel of a vehicle to which the wheel-chock lock is attached.

30. A wheel-chock lock as claimed in claim 21 wherein:
   the wheel chock assembly is attached to the lock rod by means of an angled rigid chock rod extended rigidly from a chock end of the lock rod,
   the angled rigid chock rod being extended first at a select angle from the lock rod, then perpendicular to the lock rod and finally at a complementary angle such that a wheel of a vehicle to which the wheel-chock lock is attached is positioned between the select angle and the complementary angle, and
   the wheel chock assembly is attached slidably to the angled rigid chock rod at a position in which the angled rigid chock rod is perpendicular to the lock rod.

31. A wheel-chock lock as claimed in claim 21 and further comprising:
   a second lock sleeve having a rectangular internal periphery in which the lock rod is slidable telescopically,
   a second lug-cover sleeve attached perpendicularly to the second lock sleeve,
   a second lug-bolt plate having a lug-bolt orifice through which a second lug bolt of a vehicle wheel is inserted through a bolt end of the second lug-bolt plate,
   lock-attachment walls juxtaposed to the lug-bolt orifice of the second lug-bolt plate and extended perpendicularly from an attachment end of the second lug-bolt plate,
   a second latch plate extended from a lock-attachment wall parallel to the second lug-bolt plate,
   a second lug cover on a lug-cover end of the second lug-cover sleeve,
   the second lug cover being sized and shaped to encompass and to fit over a lug nut on the second lug bolt, the second lug-bolt plate, the lock-attachment walls and the second latch plate,
   a second latch shaft positioned pivotally inside of the second lug-cover sleeve and extended from proximate the second lock sleeve to proximate the second latch plate,
   a second cover latch extended perpendicularly from a lug end of the second latch shaft at a position proximate an inside surface of the second latch plate,
   the second latch shaft being rotatable to a latched position with the second cover latch intermediate the second lug-bolt plate and the second latch plate for attaching the second lug-cover sleeve and the second lug cover to the second lug-bolt plate,
   the second latch shaft being rotatable to an unlatched position with the second cover latch external to a position intermediate the second lug-bolt plate and the second latch plate,
   a second offset latch shaft parallel to the second latch shaft,
   a second internal offset appendage attached perpendicularly to a lock end of the second latch shaft and attached perpendicularly to an internal end of the second offset latch shaft,
   a second external offset appendage parallel to the second internal offset appendage and attached perpendicularly to an external end of the second offset latch shaft,
   a second lock shaft attached perpendicularly to the second external offset appendage and extended concentrically to the second latch shaft through a second lock-shaft-bearing orifice in a second lock housing that is attached to the second lock sleeve,
   the second cover latch and the second off set latch shaft being positioned radially in relation to the second latch shaft at circumferential positions in which the second cover latch is in a locking relationship intermediate the second lug-bolt plate and the second latch plate and the second offset latch shaft is in locking relationship within a select one of the plurality of lock grooves in the lock rod simultaneously at a select locking rotational positioning of the second lock shaft,
   the second cover latch and the second offset latch shaft being positioned radially in relation to the second latch shaft at circumferential positions in which the second cover latch is in an unlocked relationship at a position external to a position intermediate the second lug-bolt plate and the second latch plate and the second offset latch shaft is in an unlocked relationship at a position external to the plurality of lock grooves in the lock rod simultaneously at a select unlocking rotational positioning of the second lock shaft,
   a lock knob attached to the second lock shaft,
   a second tumbler lock having lock tumblers extendable from a second lock cylinder into lock slots in a second lock sleeve,
   the second lock cylinder being attachable rigidly and concentrically to the second lock shaft,
   the second lock sleeve being attachable rigidly and concentrically to the second lock-shaft bearing orifice in the second lock housing, and
   the second lock tumblers being operable by standard locking means.

* * * * *